(12) United States Patent
DeLuca et al.

(10) Patent No.: US 9,189,544 B2
(45) Date of Patent: Nov. 17, 2015

(54) GRAPHICALLY REPRESENTING TAGS IN A NETWORKED COMPUTING ENVIRONMENT

(75) Inventors: Lisa Seacat DeLuca, San Francisco, CA (US); Lydia M. Do, Raleigh, NC (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 13/557,845

(22) Filed: Jul. 25, 2012

(65) Prior Publication Data
US 2014/0028708 A1    Jan. 30, 2014

(51) Int. Cl.
G09G 5/00    (2006.01)
G06F 17/30   (2006.01)
G06F 9/38    (2006.01)

(52) U.S. Cl.
CPC ...... *G06F 17/30716* (2013.01); *G06F 17/3089* (2013.01); *G06F 9/3885* (2013.01)

(58) Field of Classification Search
CPC .............................. G06F 9/50; G06F 17/30864
USPC .......................................................... 345/629
See application file for complete search history.

(56) References Cited

U.S. PATENT DOCUMENTS

| | | | |
|---|---|---|---|
| 2007/0016575 A1 | 1/2007 | Hurst-Hiller et al. | |
| 2007/0150487 A1 | 6/2007 | Christian et al. | |
| 2008/0072145 A1* | 3/2008 | Blanchard et al. | 715/273 |
| 2008/0086496 A1 | 4/2008 | Kumar et al. | |
| 2009/0046898 A1 | 2/2009 | Li et al. | |
| 2009/0144297 A1 | 6/2009 | Lyle et al. | |
| 2010/0070860 A1 | 3/2010 | Alkov et al. | |
| 2010/0229082 A1 | 9/2010 | Karmarkar et al. | |
| 2013/0259362 A1* | 10/2013 | Ghosh et al. | 382/162 |

OTHER PUBLICATIONS

Maitland, J., "Keeping Control Isn't Easy", Chapter 4: Cloud-Based Infrastructure, SearchCloudComputing.com, 13 pages. 2009.
Mell et al., "The NIST Definition of Cloud Computing", National Institute of Standards and Technology, Information Technology Laboratory, Version 15, Oct. 7, 2009, 2 pages.
Maitland, J., "Keeping Control Isn't Easy", Chapter 4: Cloud-Based Infrastructure, SearchCloudComputing.com, Publication Date: Oct. 2009, 17 pages.
Wikipedia, "Tag cloud", Oct. 9, 2011, 6 pages.
CanvasXpress, "Venn diagram", http:/canvasxpress.org/venn.html, 2010, 2 pages.

\* cited by examiner

*Primary Examiner* — Peter Hoang
(74) *Attorney, Agent, or Firm* — William E. Schiesser; Keohane & D'Alessandro PLLC; Hunter E. Webb

(57) ABSTRACT

An approach for graphically representing tags in a networked computing environment is provided. In a typical embodiment, a frequency of use of each of a set of tags contained in at least one computer storage medium of the networked computing environment will be determined. A set of relationships between the set of tags will be identified, and each of the set of tags will be displayed within a set of objects of a graphical (e.g., Venn) diagram according to the frequency. The set of relationships between the set of tags may determine an amount of overlap of the set of objects. The set of tags and/or graphical objects may be formatted to graphically represent attributes such as: topics corresponding to the set of tags, groupings of the topics corresponding to the set of tags, trends related to the set of tags, an importance of the set of tags, etc.

11 Claims, 9 Drawing Sheets

GRAPHICALLY REPRESENTING TAGS IN A NETWORKED COMPUTING ENVIRONMENT

TECHNICAL FIELD

In general, embodiments of the present invention relate to tag (terms, phrases, etc.) representation. Specifically, embodiments of the present invention relate to the graphical representation of tags in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

In such environments, various terms and/or phrases (e.g., tags) may be used to describe and/or electronically discuss certain topics. In many cases, topics may have a certain layer of overlap and, hence, some common underlying content. However, challenges may exist in making such overlay/relationships between tags and content readily apparent to an end user. As such, important relationships between sets of content may go un-noticed or un-leveraged.

SUMMARY

In general, embodiments of the present invention provide an approach for graphically representing tags (e.g., terms, phrases, search terms, trending labels of topics, etc.) associated with underlying content in a networked computing environment (e.g., a cloud computing environment). In a typical embodiment, a frequency of use of each of a set of tags contained in at least one computer storage medium (e.g., as populated based on on-line feeds, etc.) of the networked computing environment will be determined. A set of relationships between the set of tags will be identified and each of the set of tags will be displayed within a set of objects of a graphical (e.g., Venn) diagram according to the frequency. The set of relationships between the set of tags may determine an amount of overlap of the set of objects. In addition, the set of tags and/or Venn objects may be formatted (e.g., sized, colored, shaded, patterned, shaped, etc.) to graphically represent attributes such as: topics corresponding to the set of tags, groupings of the topics corresponding to the set of tags, trends related to the set of tags, an importance of the set of tags, etc.

A first aspect of the present invention provides a computer-implemented method for graphically representing tags in a networked computing environment, comprising: determining a frequency of use of each of a set of tags contained in at least one computer storage medium of the networked computing environment; identifying a set of relationships between the set of tags; displaying each of the set of tags within a set of objects of a graphical diagram according to the frequency, wherein the set of relationships between the set of tags determines an amount of overlap of the set of objects; and formatting the set of tags to represent at least one of the following: topics corresponding to the set of tags, groupings of the topics corresponding to the set of tags, trends related to the set of tags, or an importance of the set of tags.

A second aspect of the present invention provides a system for graphically representing tags in a networked computing environment, comprising: a memory medium comprising instructions; a bus coupled to the memory medium; and a processor coupled to the bus that when executing the instructions causes the system to: determine a frequency of use of each of a set of tags contained in at least one computer storage medium of the networked computing environment; identify a set of relationships between the set of tags; display each of the set of tags within a set of objects of a graphical diagram according to the frequency, wherein the set of relationships between the set of tags determines an amount of overlap of the set of objects; and format the set of tags to represent at least one of the following: topics corresponding to the set of tags, groupings of the topics corresponding to the set of tags, trends related to the set of tags, or an importance of the set of tags.

A third aspect of the present invention provides a computer program product for graphically representing tags in a networked computing environment, the computer program product comprising a computer readable storage media, and program instructions stored on the computer readable storage media, to: determine a frequency of use of each of a set of tags contained in at least one computer storage medium of the networked computing environment; identify a set of relationships between the set of tags; display each of the set of tags within a set of objects of a graphical diagram according to the frequency, wherein the set of relationships between the set of tags determines an amount of overlap of the set of objects; and format the set of tags to represent at least one of the following: topics corresponding to the set of tags, groupings of the topics corresponding to the set of tags, trends related to the set of tags, or an importance of the set of tags.

A fourth aspect of the present invention provides a method for deploying a system for graphically representing tags in a networked computing environment, comprising: providing a computer infrastructure being operable to: determine a frequency of use of each of a set of tags contained in at least one computer storage medium of the networked computing environment; identify a set of relationships between the set of tags; display each of the set of tags within a set of objects of a graphical diagram according to the frequency, wherein the set of relationships between the set of tags determines an amount of overlap of the set of objects; and format the set of tags to represent at least one of the following: topics corresponding to the set of tags, groupings of the topics corresponding to the set of tags, trends related to the set of tags, or an importance of the set of tags.

BRIEF DESCRIPTION OF THE DRAWINGS

These and other features of this invention will be more readily understood from the following detailed description of the various aspects of the invention taken in conjunction with the accompanying drawings in which.

Figure 1:
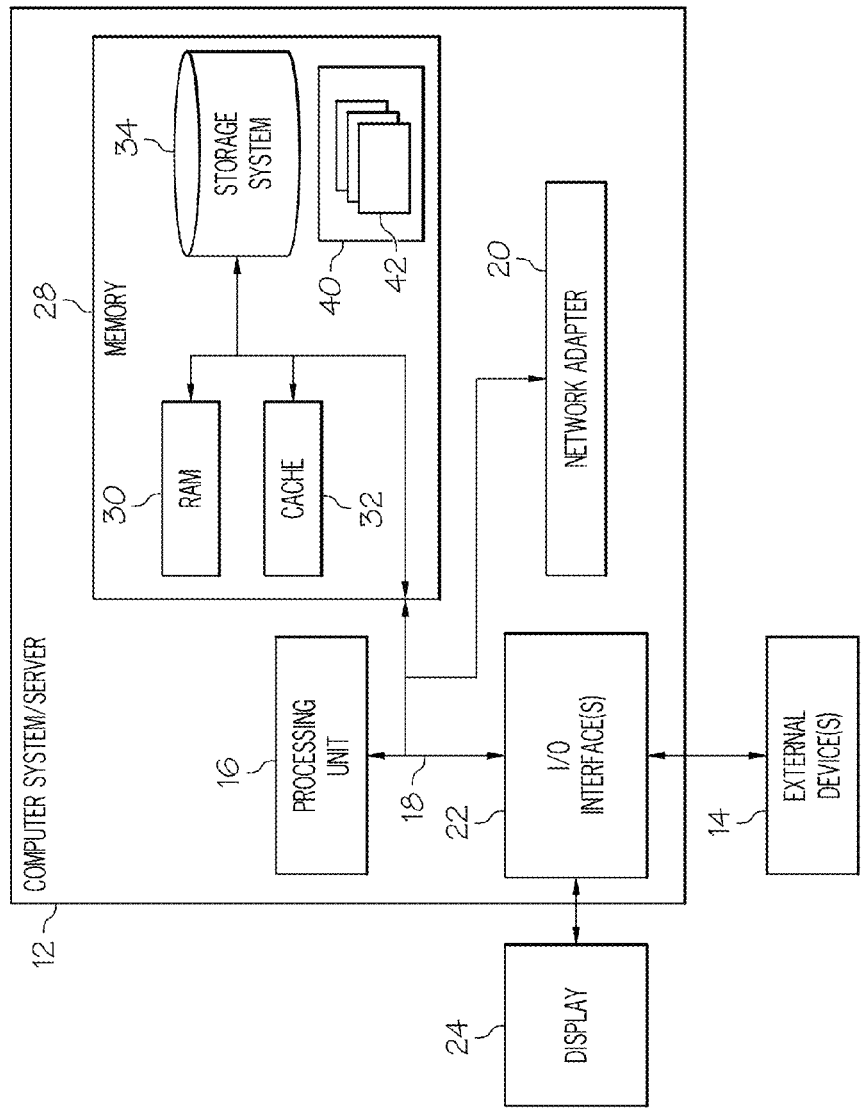
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for graphically representing tags (e.g., terms, phrases, search terms, trending labels of topics, etc.) associated with underlying content in a networked computing environment (e.g., a cloud computing environment). In a typical embodiment, a frequency of use of each of a set of tags contained in at least one computer storage medium (e.g., as populated based on on-line feeds, etc.) of the networked computing environment will be determined. A set of relationships between the set of tags will be identified and each of the set of tags will be displayed within a set of objects of a graphical (e.g., Venn) diagram according to the frequency. The set of relationships between the set of tags may determine an amount of overlap of the set of objects. In addition, the set of tags and/or Graphical objects may be formatted (e.g., sized, colored, shaded, patterned, shaped, etc.) to graphically represent attributes such as: topics corresponding to the set of tags, groupings of the topics corresponding to the set of tags, trends related to the set of tags, an importance of the set of tags, etc.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
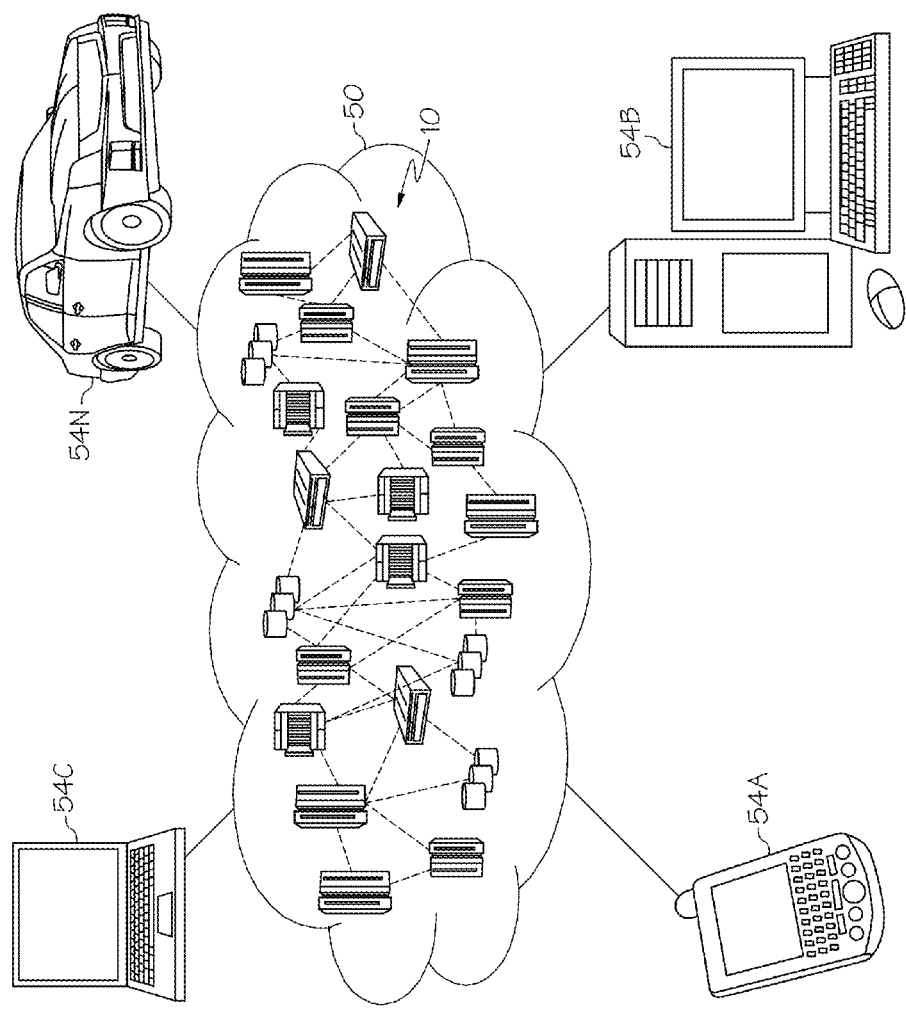
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
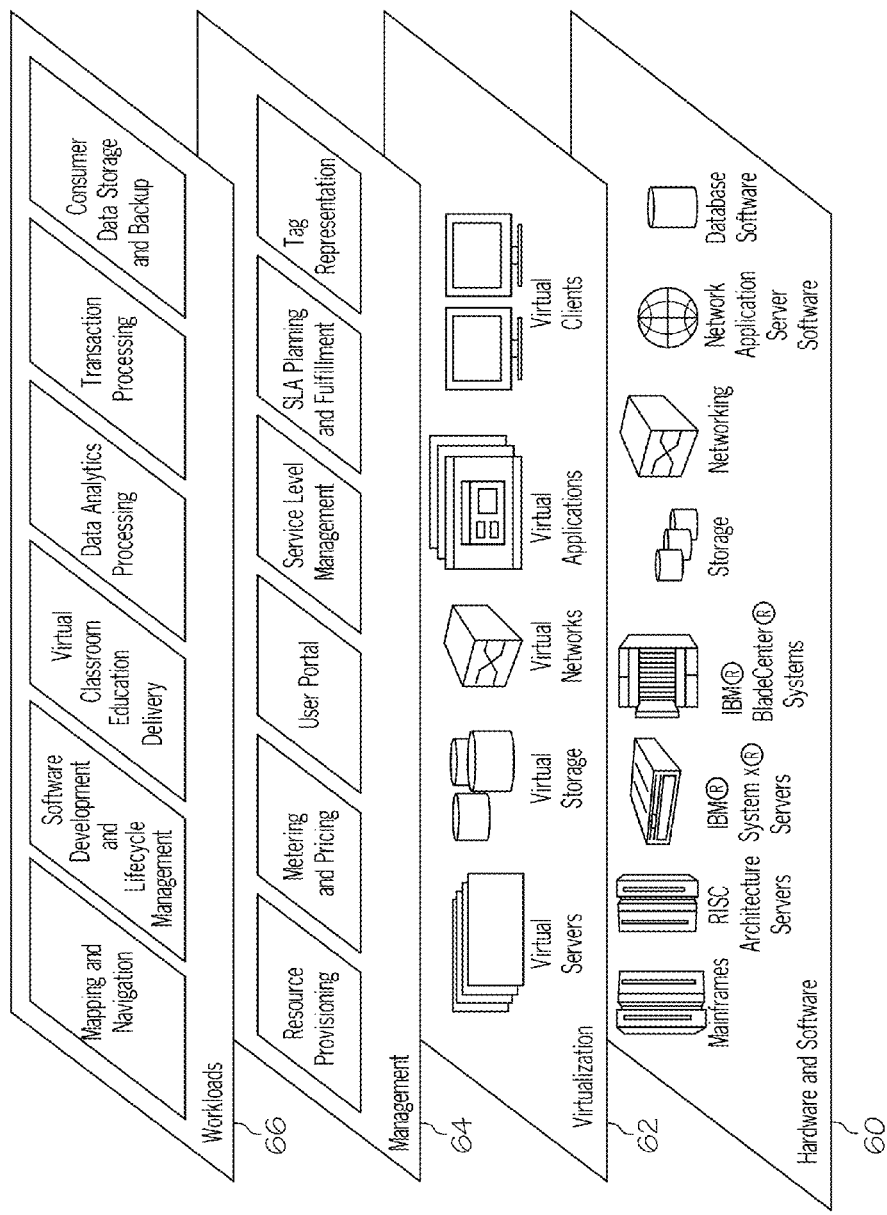
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is tag representation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the tag representation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
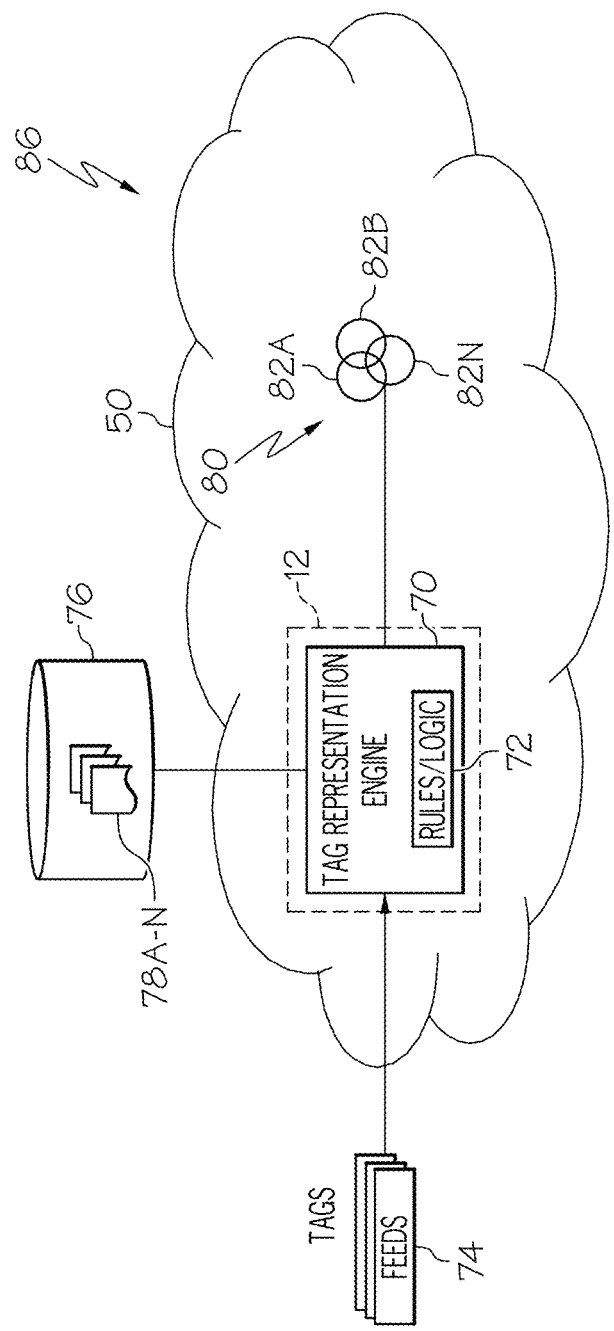
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A computer system/server 12, which can be implemented as either a stand-alone computer system or as a networked computer system is shown in FIG. 4. In the event the teachings recited herein are practiced in a networked computing environment 86, each client need not have a tag representation engine (engine 70). Rather, engine 70 could be loaded on a server or server-capable device that communicates (e.g., wirelessly) with the clients to provide graphical tag representation therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides graphical tag representation hereunder.

Along these lines, engine 70 may perform multiple functions similar to a general-purpose computer. Specifically, among other functions, engine 70 may (among other things): determine a frequency of use of each of a set of tags contained in at least one computer storage medium 76 (e.g., in one or more data structures 78A-N) of the networked computing environment 86 (e.g., as received from one or more feeds 74 such as social networking website news websites, blogs, etc.); identify a set of relationships between the set of tags; display each of the set of tags within a set of objects 82A-N of a graphical (e.g., Venn) diagram 80 (shown inside of cloud environment 80 in FIG. 4, although this need not be the case) according to the frequency, wherein the set of relationships between the set of tags determines an amount of overlap of the set of objects 82A-N; format the set of tags to represent at least one of the following: topics corresponding to the set of tags, groupings of the topics corresponding to the set of tags, trends related to the set of tags, or an importance of the set of tags; display each of the set of tags in a size that corresponds to the frequency of use; utilize different shapes for the set of tags to represent the topics corresponding to the set of tags; utilize different shapes for the set of tags to represent the groupings of the topics; utilize different colors for the set of tags to represent the trends corresponding to the set of tags; and change an intensity of the different colors for the set of tags to represent the importance of the set of tags.

In one illustrative example, the graphical diagram/representation may comprise a Venn diagram having overlapping objects (e.g., circles). Under such an embodiment, the tags (e.g., terms, phrases, search terms, trending labels of topics, etc.) may be arranged among the set of objects and formatted using formatting characteristics/options (e.g., text and/or object sizes, typefaces, colors, patterns, intensities, etc.) to graphically depict certain attributes and/or relationships of the tags. For example, the following formatting convention may be implemented via engine 70 to graphically illustrate tag attributes:

1. The larger the shape/object, the more frequently a certain word/tag/label is being used.

2. An intersection between two objects may represent a relationship among a set of tags. An intersection may be created by overlapping two or more objects.

3. A particular shape (e.g., a circle) of an object may be utilized to represent a word/tag as an example. Along these lines, different shapes may be used to represent different categories/groupings of tags. For example, the words "Action_Figure," and "Toy" may be all in round shapes to represent a group of users' interest. Terms such as "Galaxy", "Space_Ship", "Game" may all be in square shapes to represent another group of users' interest. Still yet, particular shapes may be used to represent different groups/demographics of users (e.g., terms appealing to users from ages 18-34 could be in shape 1, while tags appealing to users from ages 35-50 could be in shape 2).

4. Colors may used to represent intensity or current trend of certain topics/words/tags. For example, traditional "cold" colors such as blue (or any dark color) may represent a topic that is not highly active. Emerging topics may be represented by warm colors like yellow or orange. Similarly, highly emerging topics that are highly trending may can be represented by red.

Illustrative Example

Figure 5:
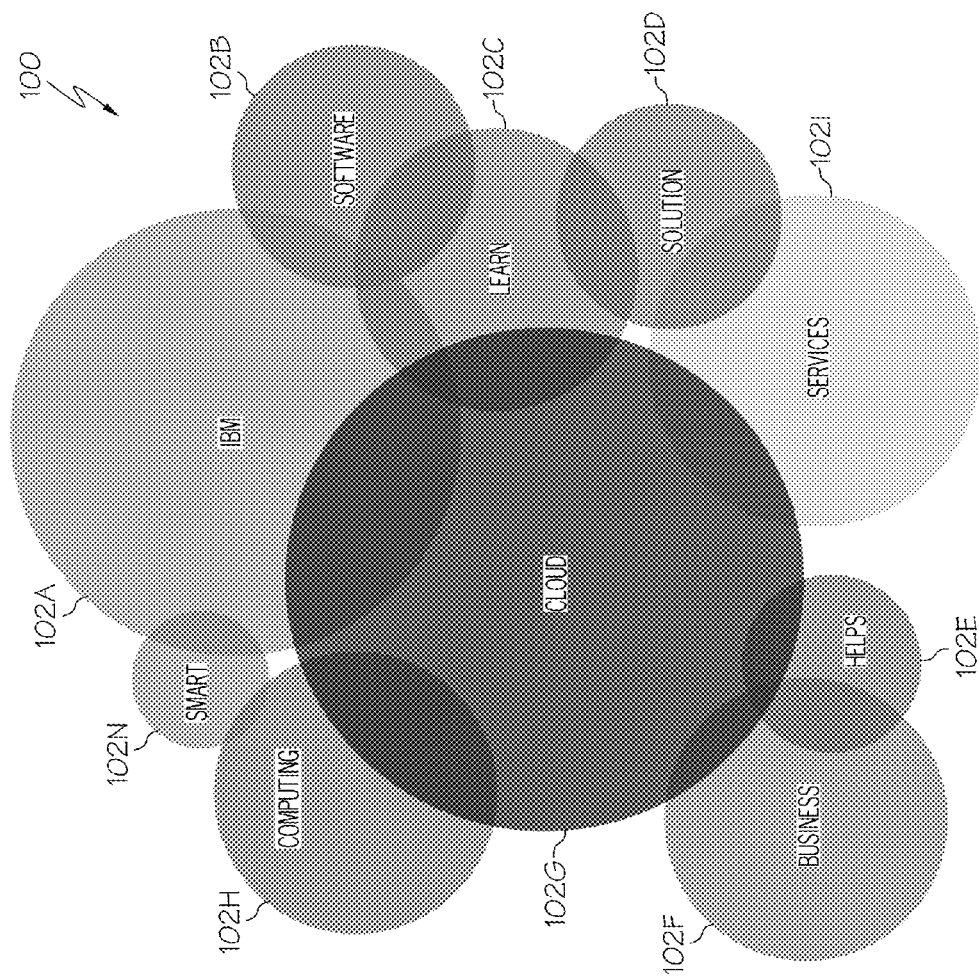
FIG. 5 depicts a graphical (e.g., Venn) diagram having tags integrated therewith and formatted to reflect various attributes according to an embodiment of the present invention.

These concepts will be further described in conjunction with the illustrative examples set forth in FIGS. 5-8. In is understood that although FIGS. 4-8 depict a Venn diagram, the teachings recited herein could be implemented in conjunction with any type of graphical diagram whereby objects thereof may overlap and be used to display tags or the like. In any event, FIG. 5 depicts a graphical (e.g., Venn) diagram/representation 100 having tags integrated therewith and formatted to reflect various attributes according to an embodiment of the present invention. Specifically, as shown, objects 102A-N are arranged in a Venn-like fashion whereby portions of objects 102A-N may overlap. In general, overlapping of objects indicates an overlapping of the tags contained therein. For example, objects 102G and 102H may overlap due to the strong interrelationship between the terms "cloud" and "computing".

Under such an embodiment, word frequencies may be determined using any technique (e.g., counters) now known or later developed). Along with the frequencies, relationships between words may also be determined. For example, relationships may be contextual (e.g., based on search results, social networking relationships, filtering of results, relatedness of words, etc).

Figure 6:
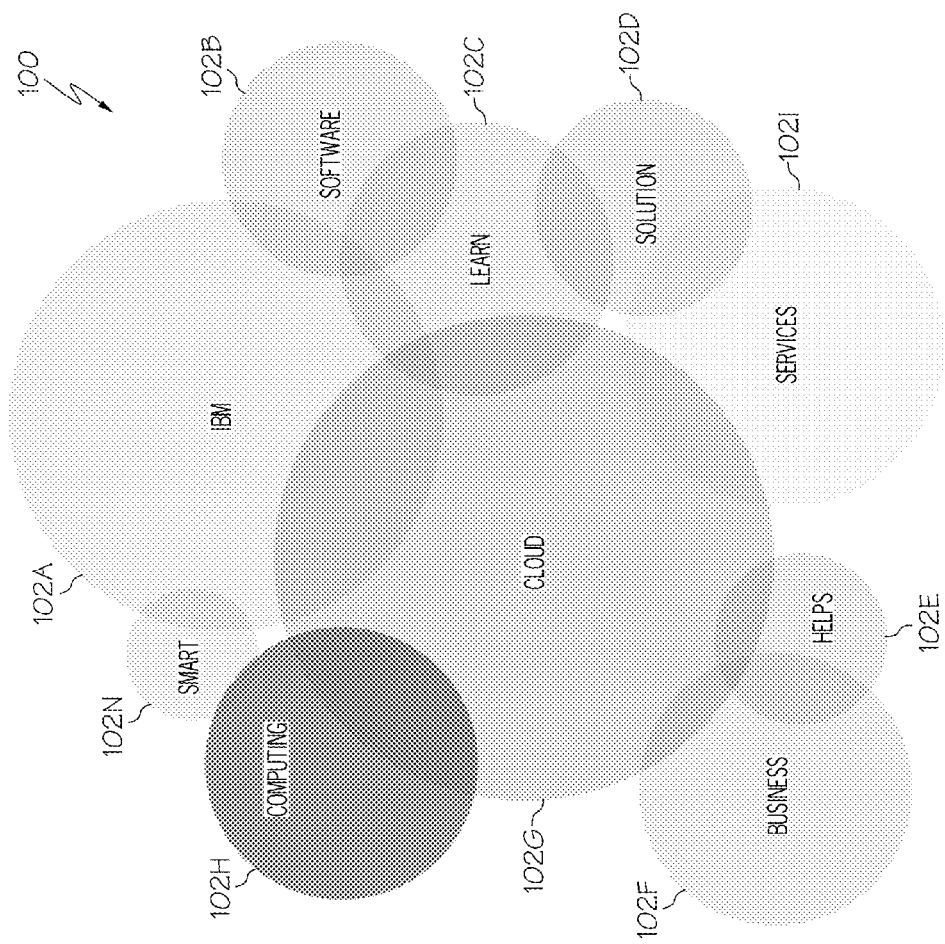
FIG. 6 depicts a graphical diagram with varying color intensities to reflect various attributes according to an embodiment of the present invention.

Referring now to FIG. 6, graphical diagram 100 may be generated using various formatting conventions to graphically represent tag attributes. For example, a circle/Venn object may be bigger for more popular/frequent tags. A circle/Venn object may be smaller for less popular/frequent tags. If a relationship exists between various tags, circles/Venn objects associated therewith may overlap. Shapes may be also used to represent different groupings of topics or even different perspectives/preferences from different users. Colors may be used to represent trends. For example, intensity of colors may be used to represent a topic's importance/status (e.g., controversial). In particular, topics that are not that controversial may be opaque in colors, while very controversial topics may be in solid colors. Patterns/fill of the shape may be used to add additional dimension of measurement.

Referring back to FIG. 5, it can be seen that tags/words that have the highest frequency because their objects are larger (e.g., cloud 102G, IBM® (IBM and related terms are trademarks of IBM Corporation in the United States and/or other countries. IBM is shown in lowercase letters for illustrative purposes only. As such, it is understood that IBM may be shown in other typefaces and/or capitalization conventions.) 102A, computing 102H, services 102I, business 102F, and learn 102C). There may the additional benefit of viewing the relationship between the words. For example, almost all of the tags are related to the cloud so that their circles overlap with the circle 102G for the cloud.

In another embodiment, a graphical diagram may be generated to represent each user's discussed/shared topics. This may make it easier to discover any data outliers that could be potentially suspect. Specifically, topics that are associated with data point outliers may be considered suspect and/or may be fake messages/postings, a denial of service attack, etc initiated from a hacker who may have illicitly utilized a user's account. In addition, one user's diagram can overlap with another user's diagram via several connection points to illustrate the commonality among users.

As indicated above, any technique may be used to determined tag frequency. In one embodiment, a counter-like implementation may be utilized. For example, every time a word or phrase is used, it may be given 1 point. After each word or phrase has been given a frequency score, the system may generate an object according to the point given. For example, the word or phrase with the most points may have the biggest area, the next highest points may have the next biggest area, and so on. If a word had 2 points and another word had 4 points, the circle for the word/phrase with 4 points may be twice as big or have twice as much area as the word with only 2 points.

Moreover, as indicated above, if a relationship exists between various words or phrases, the graphical diagram may overlap those circles/objects. For example, as the relationship is stronger or weaker, the overlap grows or shrinks. As shown in FIG. 5, if the tag "cloud" had a close relationship with the tag "learn", then the overlap would be very close. Conversely, because the tag "cloud" is deemed to have no relationship with the tag "smart," then an overlap might not exist (as depicted).

Shapes may be used to represent different groupings of topics or even different perspectives/preferences from different users. Tags that have a similar grouping or theme might have a common shape. In the case of cloud computing, the shape might be of a cloud. This may allow users to immediately see how cloud-based tags are related to other tags. Still yet, colors may be used to represent trends. The warmer the color, the more recently discussed the topic may be. Along similar lines, intensity of colors may be used to represent a topic's importance and/or level of controversy. For example, topics that are not that controversial may be in opaque colors, while controversial topics may be in solid colors. FIG. 6 shows an example color intensity variation. As can be seen, several objects such as 102B and 102C each appear to be translucent or have low color intensities. This may be used as an example of less controversial terms.

Figure 7:
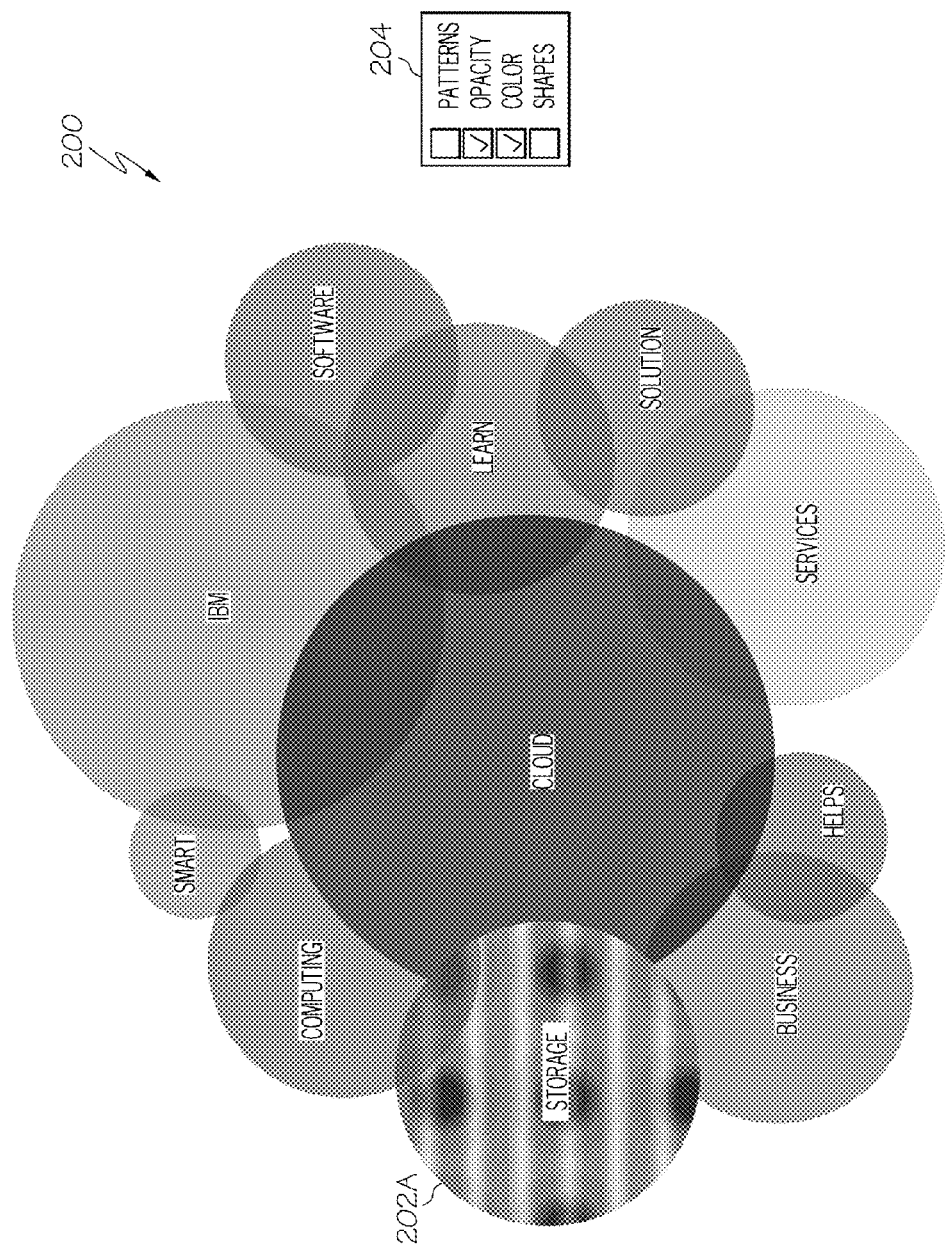
FIG. 7 depicts a graphical diagram with varying opacities and patterns to reflect various attributes according to an embodiment of the present invention.

In another embodiment, patterns/fill of an object may be used to add additional dimension of measurement. Referring to FIG. 7, this concept is further shown in more detail. As shown, a new graphical diagram 200 has been generated whereby a new object 202A has been added (to graphical diagram 100). As can be further seen, a new tag "storage" is present with a fill pattern within object 202A. The fill could refer to any type of attribute such as a frequency that others within the user's social network are using. In utilize fill/patterns, different types and/or configurations of fills/patterns may be utilized to depict different relationships, strengths of relationships, etc. Along these lines, a key 204 may be used to allow users to choose which user experience options to enable for graphical diagram 200. Buttons or checkboxes could be provided in key 204 to enable/disable features. Users may also wish to dock or lock a certain word/phrase to the center of the display. This will cause the graphical diagram to be redrawn, such that the relationships are maintained around the center object.

Figure 8:
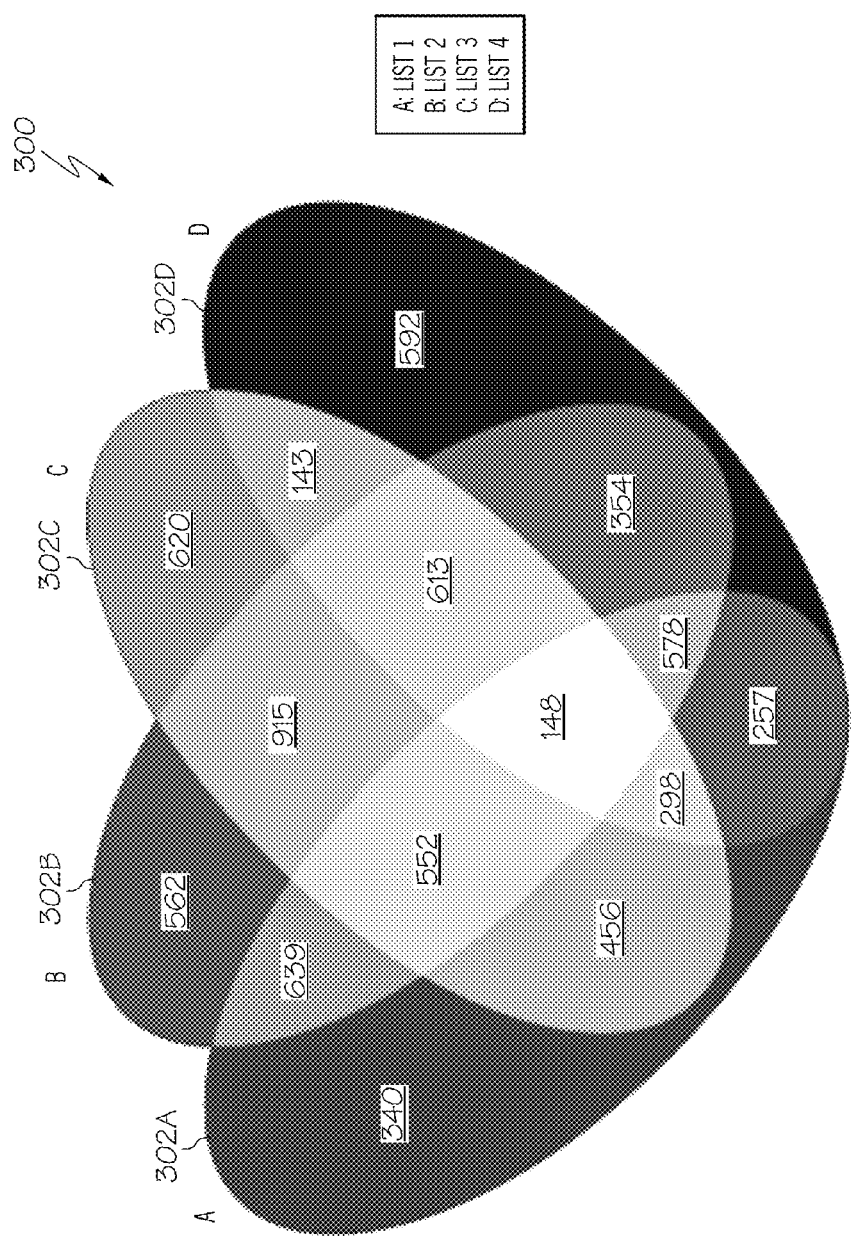
FIG. 8 depicts a graphical diagram being implemented using Java and HTML5 Canvas approaches according to an embodiment of the present invention.

In general, the embodiments of the present invention may be technically implemented using technologies such as JavaScript® (Java, JavaScript and related terms are trademarks of Sun Microsystems, Inc., in the United States and/or other countries) and html5 canvas (to name a few). An example of this is shown in FIG. 8. Specifically, FIG. 8 shows a diagram 300 having groupings 302A-D of objects according to lists (e.g., lists 1-4). Groupings 302A-D show term counts and overlaps and may provide the basis for generation of graphical diagrams 100 and/or 200.

Figure 9:
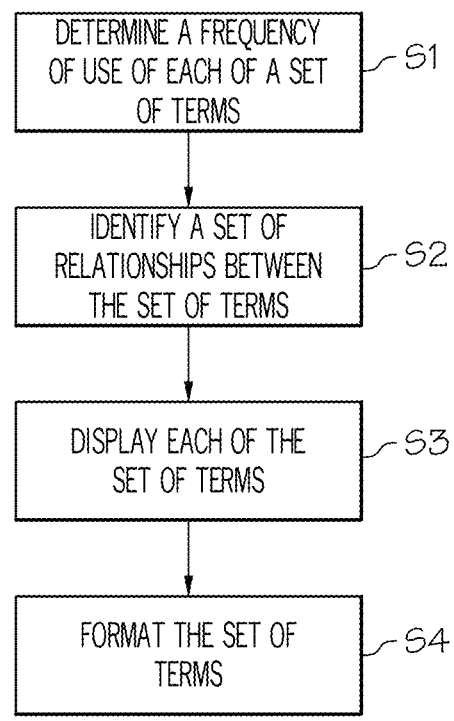
FIG. 9 depicts a method flow diagram according to an embodiment of the present invention.

Referring now to FIG. 9, a method flow diagram according to an embodiment of the present invention is shown. In step S1, a frequency of use of each of a set of tags contained in at least one computer storage medium of the networked computing environment is determined. In step S2, a set of relationships between the set of tags is identified. In step S3, each of the set of tags is displayed within a set of objects of a graphical (e.g., Venn) diagram according to the frequency (e.g., with the set of relationships between the set of tags determining an amount of overlap of the set of objects). In step S4, the set of tags is formatted to represent at least one of the following: topics corresponding to the set of tags, groupings of the topics corresponding to the set of tags, trends related to the set of tags, or an importance of the set of tags.

While shown and described herein as a graphical tag representation solution, it is understood that the invention further provides various alternative embodiments. For example, in one embodiment, the invention provides a computer-readable/useable medium that includes computer program code to enable a computer infrastructure to provide graphical tag representation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide graphical tag representation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for graphical tag representation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for graphically representing tags in a networked computing environment, comprising:
   determining, using at least one computer device, a frequency of use of each of a set of tags associated with content contained in at least one computer storage device of the networked computing environment, the content being received from one or more feeds together with the associated tags, which describe a subject matter of the content;
   identifying, using the at least one computer device, a set of relationships between the set of tags;
   displaying, using the at least one computer device, each of the set of tags within a set of objects of a graphical diagram according to the frequency, wherein the set of relationships between the set of tags determines an amount of overlap of the set of objects; and
   formatting, using the at least one computer device, the set of tags in the graphical diagram to represent each experience option in turn enabled by a selection by a user from the following:
      utilizing different shapes for the set of tags to represent topics corresponding to the set of tags,
      utilizing different shapes for the set of tags to represent groupings of the topics corresponding to the set of tags,
      utilizing different colors for the set of tags to represent trends related to the set of tags, and
      changing an intensity of the different colors for the set of tags to represent an importance of the set of tags.

2. The computer-implemented method of claim 1, the displaying comprising displaying each of the set of tags in a size that corresponds to the frequency of use.

3. The computer-implemented method of claim 1, the networked computing environment comprising a cloud computing environment.

4. The computer-implemented method of claim 1, further comprising providing a mechanism for selecting the at least one experience option by toggling a set of features of the graphical diagram that correspond to each of the experience options.

5. The computer-implemented method of claim 4, further comprising:
   locking a particular tag of the set of tags a corresponding object of the set of objects in a particular location of the graphical diagram; and
   modifying the graphical diagram in response to an interaction with the mechanism for toggling, wherein the particular tag and the corresponding remain in the particular location despite the interaction.

6. A system for graphically representing tags in a networked computing environment, comprising:
   a memory medium comprising instructions;
   a bus coupled to the memory medium; and
   a processor coupled to the bus that when executing the instructions causes the system to:
      determine a frequency of use of each of a set of tags associated with content contained in at least one computer storage device of the networked computing environment, the content being received from one or more feeds together with the associated tags, which describe a subject matter of the content;
      identify a set of relationships between the set of tags;
      display each of the set of tags within a set of objects of a graphical diagram according to the frequency, wherein the set of relationships between the set of tags determines an amount of overlap of the set of objects; and
      format the set of tags in the graphical diagram to represent each experience option in turn enabled by a selection by a user from the following:
         utilizing different shapes for the set of tags to represent topics corresponding to the set of tags,
         utilizing different shapes for the set of tags to represent groupings of the topics corresponding to the set of tags,
         utilizing different colors for the set of tags to represent trends related to the set of tags, and
         changing an intensity of the different colors for the set of tags to represent an importance of the set of tags.

7. The system of claim 6, the memory medium further comprising instructions for causing the system to display each of the set of tags in a size that corresponds to the frequency of use.

8. A computer program product for graphically representing tags in a networked computing environment, the computer program product comprising a computer readable storage device, and program instructions stored on the computer readable storage device, to:
   determine a frequency of use of each of a set of tags associated with content contained in at least one computer storage device of the networked computing environment, the content being received from one or more feeds together with the associated tags, which describe a subject matter of the content;
   identify a set of relationships between the set of tags;
   display each of the set of tags within a set of objects of a graphical diagram according to the frequency, wherein the set of relationships between the set of tags determines an amount of overlap of the set of objects; and
   format the set of tags in the graphical diagram to represent each experience option in turn enabled by a selection by a user from the following:
      utilizing different shapes for the set of tags to represent topics corresponding to the set of tags,
      utilizing different shapes for the set of tags to represent groupings of the topics corresponding to the set of tags,
      utilizing different colors for the set of tags to represent trends related to the set of tags, and changing an intensity of the different colors for the set of tags to represent an importance of the set of tags.

9. The computer program product of claim 8, the computer readable storage device further comprising instructions to display each of the set of tags in a size that corresponds to the frequency of use.

10. The computer program product of claim 8, the networked computing environment comprising a cloud computing environment.

11. A method for deploying a system for graphically representing tags in a networked computing environment, comprising:

providing a computer infrastructure being operable to:
  determine a frequency of use of each of a set of tags contained in at least one computer storage medium of the networked computing environment;
  identify a set of relationships between the set of tags;
  display each of the set of tags within a set of objects of a graphical diagram according to the frequency, wherein the set of relationships between the set of tags determines an amount of overlap of the set of objects; and
  format the set of tags in the graphical diagram to represent each experience option in turn enabled by a selection by a user from the following:
   utilizing different shapes for the set of tags to represent topics corresponding to the set of tags,
   utilizing different shapes for the set of tags to represent groupings of the topics corresponding to the set of tags,
   utilizing different colors for the set of tags to represent trends related to the set of tags, and
   changing an intensity of the different colors for the set of tags to represent an importance of the set of tags.

\* \* \* \* \*